(12) United States Patent
Chao et al.

(10) Patent No.: US 6,606,068 B1
(45) Date of Patent: Aug. 12, 2003

(54) LAYOUT FOR MULTI-ANTENNA LOOPS OF THE ELECTROMAGNETIC-INDUCTION SYSTEM

(75) Inventors: Ching-Chuan Chao, Taipei (TW); Chih-An Chen, Taipei (TW); I-Wen Wang, Chung-Ho (TW)

(73) Assignee: Aiptek International Inc., Hsin-Chu (TW)

( * ) Notice: Subject to any disclaimer, the term of this patent is extended or adjusted under 35 U.S.C. 154(b) by 3 days.

(21) Appl. No.: 10/062,768

(22) Filed: Feb. 5, 2002

(51) Int. Cl.$^7$ ............................................... H01A 11/12
(52) U.S. Cl. ...................... 343/742; 343/741; 343/867; 343/876
(58) Field of Search ................................ 343/741, 742, 343/866, 867, 876; H01Q 3/24, 11/12

(56) References Cited

U.S. PATENT DOCUMENTS

| | | | | |
|---|---|---|---|---|
| 3,972,048 A | * | 7/1976 | Davis | 343/712 |
| 5,084,710 A | * | 1/1992 | Whittington | 343/876 |
| 5,151,709 A | * | 9/1992 | Balzano et al. | 343/741 |
| 5,786,763 A | * | 7/1998 | Canipe | 340/572.7 |
| 6,154,177 A | * | 11/2000 | Saito et al. | 343/702 |
| 6,229,494 B1 | * | 5/2001 | Merenda | 343/741 |
| 6,392,610 B1 | * | 5/2002 | Braun et al. | 343/876 |

* cited by examiner

*Primary Examiner*—Tho Phan
(74) *Attorney, Agent, or Firm*—Rosenberg, Klein & Lee

(57) ABSTRACT

The layout of multi-antenna loops in this invention comprises: a plurality of antenna loops, wherein one terminal of each antenna loop is electrically coupled with an antenna switch and the other terminal is electrically connected to a ground wire. All antenna loops are symmetrical antenna loops each of which contains a plurality of n-shaped sections to form sawtooth-shaped regions and compound into a plurality of dummy closed regions. If the symmetrical antenna loops are in-phase state, the plurality of sawtooth-shaped regions consist of the plurality of n-shaped sections with the non-interlacing method; if the symmetrical antenna loops are oppositephase state, the plurality of sawtooth-shaped regions consist of the n-shaped sections with the interlacing method.

35 Claims, 7 Drawing Sheets

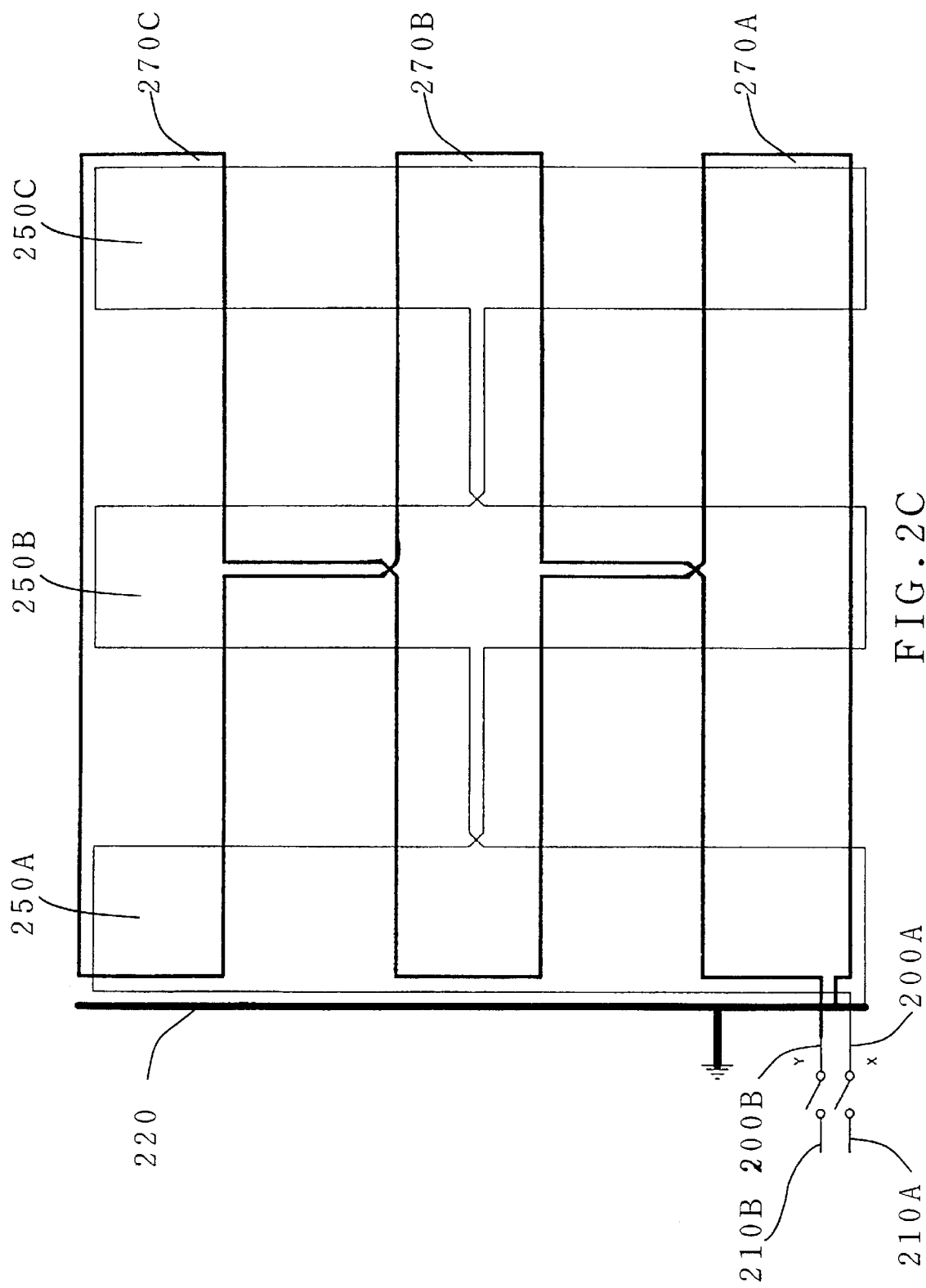

LAYOUT FOR MULTI-ANTENNA LOOPS OF THE ELECTROMAGNETIC-INDUCTION SYSTEM

BACKGROUND OF THE INVENTION

1. Field of the Invention

The present invention relates generally to antenna loops of the electromagnetic-induction system, and more particularly to a layout for multi-antenna loops of the electromagnetic-induction system.

2. Description of the Prior Art

Because a handwriting recognition system could replace the mouse, and is more suitable than the mouse to let the user input words and patterns by user's hands, improvement of the handwriting recognition system is a hot and important field of current computer technology. The original intention of the handwriting recognition system is to replace the mouse. As usual, to enhance the user's convenience, a handwriting recognition system would usually replace the mouse by both wireless pen and tablet. Herein, the pen nib of the wireless pen usually corresponds to the left button of the mouse. Conventional handwriting recognition systems have been developed for many years, but these products are applied to perform only one function, such as drawing or inputting a word.

In the conventional system with electromagnetic-induction, there are usually a digitizer tablet and a transducer/cursor in the form of a pen or a puck. As is well known, there are two operation modes for determining the position of a pointing device on the surface of a digitizer tablet, wherein one is a relative mode, and the other is an absolute mode. A mouse device operates in a relative mode. The computer sensing the inputs from a mouse recognizes only relative movements of the mouse in X and Y directions as it is slid over the surface on which it is resting. If the mouse is lifted and repositioned on the surface, no change in the signal to the computer will be detected. A common approach uses a sensing apparatus inside the mouse to develop a pair of changing signals corresponding to the longitudinal and transversal movements of the mouse. On the contrary, a cursor device in a digitizer tablet system, such as wireless pen, operates in an absolute mode. If a cursor device is lifted and moved to a new position on its supporting surface, its signal to a computer will change to reflect the new absolute position of the cursor device. Nowadays, various methods have been used to determine the position of a cursor device on the surface of its supporting tablet, wherein one common skill which is applied for the absolute mode is electromagnetic field sensing. Early transducer/cursors were connected to the tablet by means of a multi-conductor cable through which the position and button/pressure information are transferred virtually without any problem. The cordless transducer/cursors in some of the prior arts have attempted to use frequency and/or phase changes to transmit the non-positional status of the transducer/cursor functions such as buttons pushed, pen pressure, or the like. However, if there is no sophisticated processing, frequency and phase changes are very prone to false reading resulting from several outside factors such as metal objects, noise, electromagnetic wave and so on. These problems become more apparent, especially in a larger digitizer tablet. Improvements have also been made in the prior arts to allow a user to use pointing devices on a digitizer tablet system in dual modes of operation that can provide information of either a relative movement or an absolute position under the control of the user.

Usually, a handwriting recognition system is a device with electromagnetic-induction. Conventional electromagnetic-induction device comprises: an electromagnetic pen and a tablet. There is an oscillating circuit that consists of LC in the electromagnetic pen. If the pen point is touched, the amount of inductance will be changed that results in the variation of oscillating frequency. The amount of inductance is increased when touching the pen point and increasing pressure so the variation of oscillating frequency is also increased. Therefore, the variation of the pressure on the pen point can be detected by way of the variation of oscillating frequency. There are two switches on the sidewall of the electromagnetic pen, the emitted frequency of the electromagnetic pen can be changed with the capacitance variation of the LC device that is produced by pushing down or setting free the switches. Furthermore, the tablet comprises a detector, an amplifier and an analog-digital converter. In the conventional tablet, there is a detected loop in the center region of the tablet, with antenna loops located on the double faces of the detecting loop, wherein the antenna loops are equidistantly arranged in order by way of using array. The main purpose of the detecting loop is only applied to receive the electromagnetic wave that is emitted by the electromagnetic pen. When the electromagnetic pen emits the electromagnetic wave, the antenna loops receive the electromagnetic wave, and then the tablet can obtain correlative information by the electromagnetic induction.

In general, antenna loops and layout thereof in the conventional electromagnetic-induction device arranges antennas as check network that are distributed with equidistance in the X-direction and Y-direction of two-dimensional Cartesian coordinates to induce the electromagnetic pen and calculate the absolute position thereof. Refer to FIG. 1A, it shows a layout for antenna loops distributed in the X-direction of two-dimensional Cartesian coordinates, wherein one terminal of each of the antenna loops 110A is connected to each switch (X1 to X25) and the other terminal is electrically coupled with a ground wire 105A, whereby the reduced signal of each of the antenna loops 110A can be detected by controlling the switches (X1 to X25). Because of the inverse proportion of the magnetic field intensity to the square of distance the electromagnetic pen that can emit electromagnetic wave is away from the tablet to result in more and more weak induced signal that is received by antenna loops; on the contrary, the induced signal that is received by antenna loops is an increasing number of intensity when the electromagnetic pen approaches the tablet. Therefore, CPU of the tablet scans one by one and in turn each of the antenna loops to analyze intensity of induced signals that are received by each antenna loops, so as to detect the position where the cordless pen is located and calculate the coordinates thereof.

However, there is an increasing number of antenna loops in the tablet having much larger area so a great amount of antenna switches is necessary. Nowadays, a method that can decrease amount of antenna switches by forming n-shaped sections 120 in the same antenna loop is provided. Refer to FIG. 1B, each of antenna loops (X1 to X9 and XA to XC) distributed along the X-direction of two-dimensional Cartesian coordinates (X, Y), and each of antenna loops (X1 to X9 and XA to XC) comprises a plurality of logical sections 120. Regarding to each of the antenna loops (X1 to X9 and XA to XC) distributed in the same direction, the adjacent logical sections of each logical section 120 therein belongs to different antenna loops (X1 to X9 and XA to XC), whereby the position of electromagnetic pen can be located on the n-shaped section of which the antenna loop is. For example, for the n-shaped section denoted by numbers 120A of the antenna loop X5, its adjacent n-shaped sections 130 and 140 belong to the antenna loops X4 and X6 respectively. However, for the next logical section denoted by number 120B of the antenna loop X5, its adjacent n-shaped logical sections 150 and 160 belong to the antenna loops XC and X2 respectively. Thus, the position of the pen can be decided by the induction voltage produced by physical antenna loops X5, X4, X6, XC and X2 whether the electromagnetic pen (not shown) moves above the n-shaped section denoted by number 120A of the antenna loop X5, or above the n-shaped logical section denoted by number 120B of the antenna loop X5. As foregoing description, amount of the switches in FIG. 1B, such as twenty-five switches, is less than that in FIG. 1A, such as twelve.

In conventional method, it is necessary to be noticed that the distance between two adjacent logical sections in the same physical antenna loop (e.g. the distance L between the adjacent logical sections of the physical antenna loop X5 noted by number 120A and 120B) must be adequate. If the distance is too small, it is possible to make a mis-judgment in deciding the position of the electromagnetic pen. On the other hand, nowadays, digital products are developed toward the aspect of high speed for processing information, which is resulted in electromagnetic interference as high as speed. Generally, there are various digital products around the specific place for using the digital tablet. In terms of the digital tablets with bigger areas that are commercially required, the amount of switches and antenna loops in the digitizer tablets prior art is increased accordingly; therefore, the method that increases amount of n-shaped sections in the same antenna loop is provided to decreased a great amount of antenna switches. Here the method increases length of the antenna loop so as to generate electromagnetic noise, that is, it is easy to be interfered with the electromagnetic noise, and that affects the calculation of the position of the pen that is located on the digital tablet. Furthermore, FIG. 1C shows conventional layout for antenna loops in that the layout of antenna loops distributed along the X-direction and Y-direction of two-dimensional Cartesian coordinates connected a ground wire 105A and 105B respectively and that both arrangement for layout of the antenna loops 110A and 110B overstep the ground wires 105A and 105B, and thus, a predetermined space 170 requires being provided for placing the antenna loops 110A and 110B distributed over the ground wires 105A and 105B, which is located on the boundary region within conventional tablet. Therefore, it is resulted in the limitation for scaling down area, and further, that is difficult to make the panel with small boundary region. In accordance with the above description, a new layout for multi-antenna loops in the electromagnetic-induction system is therefore necessary, so as to solve the problems mentioned from foregoing description.

SUMMARY OF THE INVENTION

In accordance with the present invention, a new layout for multi-antenna loops in electromagnetic-induction system is provided that substantially overcomes the drawbacks of above problems mentioned from the conventional system.

Accordingly, it is an object of the present invention to provide a layout for multi-antenna loops of electromagnetic-induction system. The present invention can form antenna loop with sawtooth-shaped section and dummy closed section by n-shaped section with in-phase state to perform the layout of multi-antenna loops, so as to reduce amount of antenna switches and to distribute entire antenna loops along X-axis and Y-axis within the same ground wire.

Accordingly, this invention can so reduce the space requirement and the panel area thereof that it scales product's size down and makes productive cost down. Therefore, this invention corresponds to economic effect and utilization in industry.

Another object of the present invention is to provide a layout for multi-antenna loops of electromagnetic-induction system. The present invention can form an antenna loop with sawtooth-shaped sections and dummy closed sections by n-shaped sections with oppositephase state to perform a layout of multi-antenna loops so as to reduce amount of antenna switches, and in order that the entire antenna loops along X-axis and Y-axis can be distributed within the same ground wire. Accordingly, this invention can avoid jamming antenna loops with electromagnetic noise around the tablet, so that the efficiency of electromagnetic-induction system can be strengthened.

In accordance with the present invention, a new layout for multi-antenna loops of the electromagnetic-induction system is provided in order to achieve the above-mentioned and other objects. The layout of multi-antenna loops in this invention comprises: a plurality of antenna loops distributed along the X-direction and Y-direction of two-dimensional Cartesian coordinates, wherein one terminal of each antenna loop is electrically coupled with an antenna switch and the other terminal is electrically connected to a ground wire; especially, all plurality of antenna loops distributed along the X-direction and Y-direction are electrically connected with the same ground wire. In light of all antenna loops, those are symmetrical antenna loops each of which contains a plurality of substantially identical n-shaped sections, wherein every one of the n-shaped sections is connected with another one of those in the same antenna loop to form a plurality of sawtooth-shaped regions; and further, every two of the plurality of sawtooth-shaped regions are in opposition to each other, and the n-shaped sections of those are face to face from each other so as to form a plurality of dummy closed regions. If the symmetrical antenna loops are in-phase state, that is, the n-shaped sections of the same antenna loops that are adjacent from each other are in-phase state, the plurality of sawtooth-shaped regions are formed by using the plurality of n-shaped sections with the non-interlacing method; if the symmetrical antenna loops are oppositephase state, that is, the n-shaped sections of the same antenna loops that are adjacent from each other are oppositephase state, the plurality of sawtooth-shaped regions are formed by crossing the n-shaped sections from each other with the interlacing method.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Preferred embodiments of the present invention will now be described in greater detail. Nevertheless, it should be recognized that the present invention can be practiced in a wide range of other embodiments besides those explicitly described, and the scope of the present invention is expressly not limited except as specified in the accompanying claims.

Figure 1A:
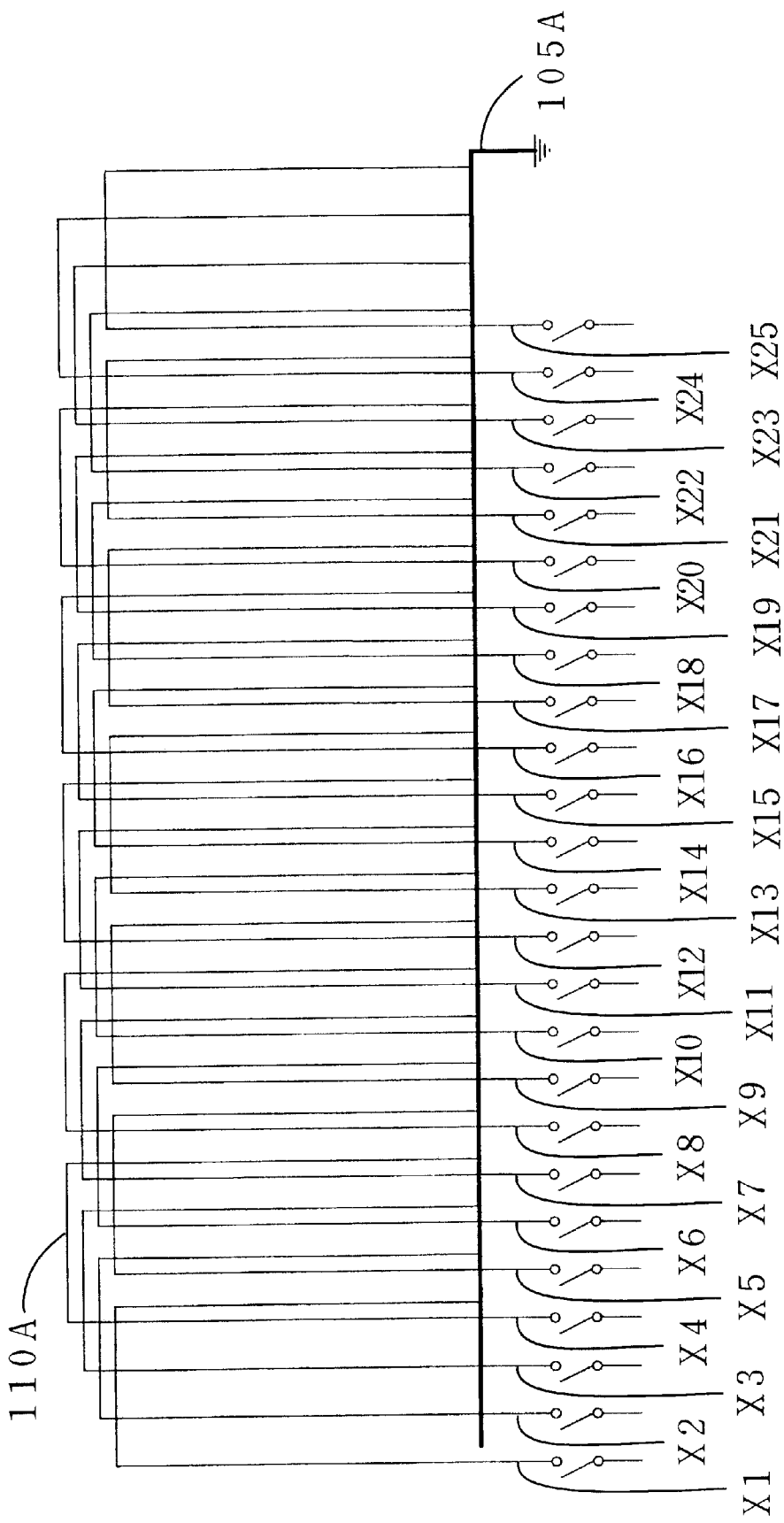
FIG. 1A shows cross-sectional views illustrative of conventional layout of antenna loops distributed along the X-direction in electromagnetic-induction system.
Figure 1B:
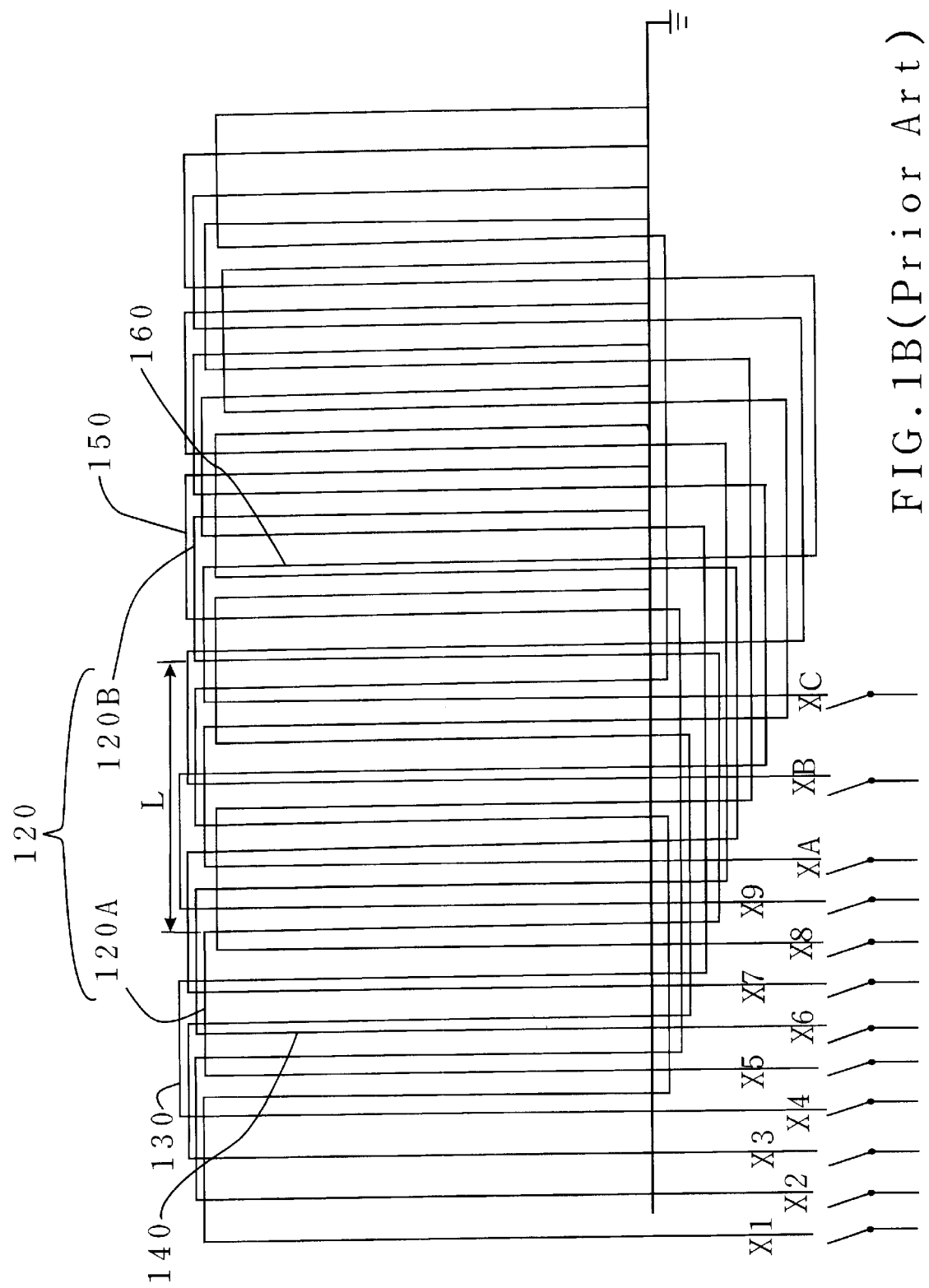
FIG. 1B shows cross-sectional views illustrative of conventional layout of antenna loops with the n-shaped sections distributed along the X-direction in electromagnetic-induction system.
Figure 1C:
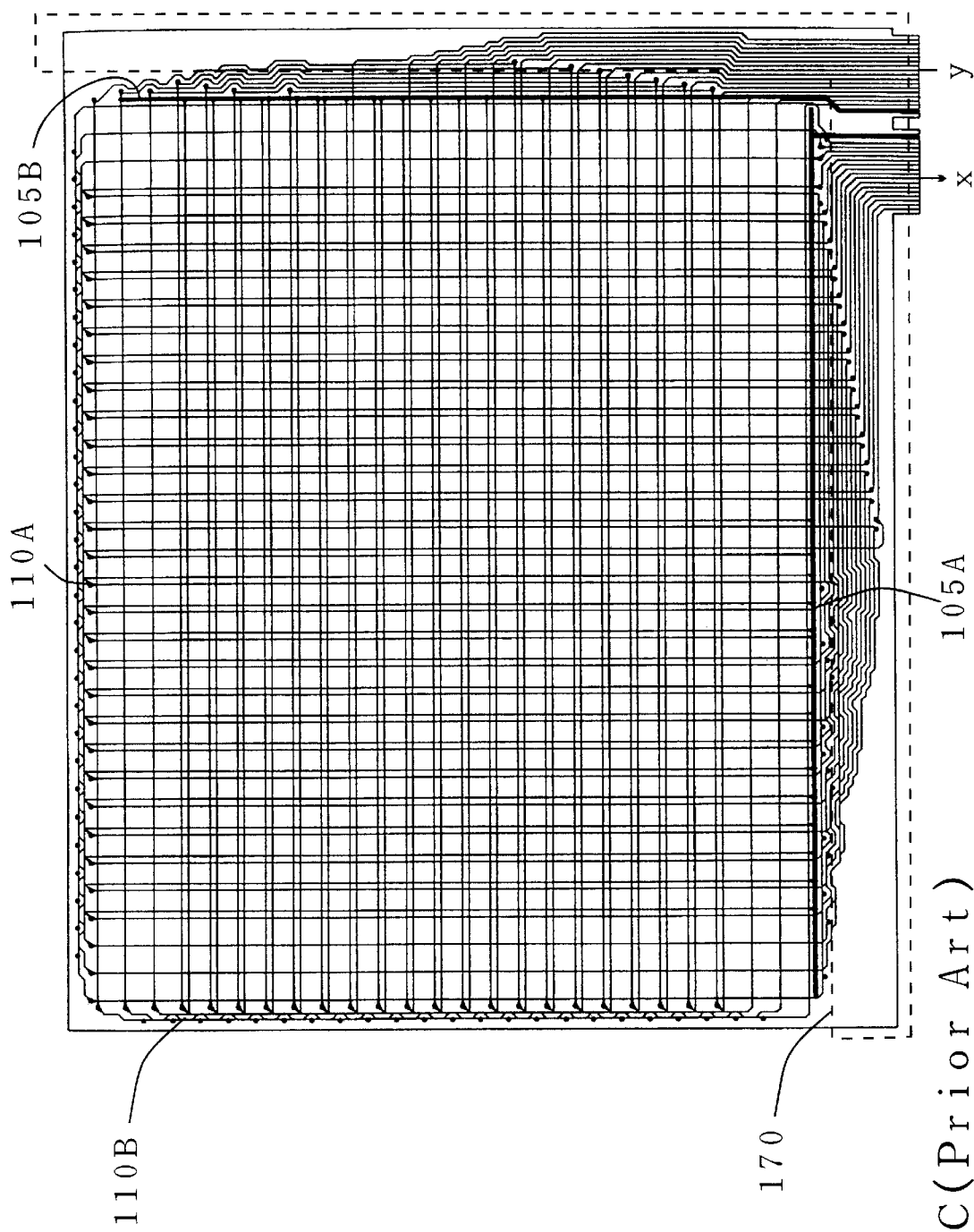
FIG. 1C shows cross-sectional views illustrative of conventional layout of antenna loops with the n-shaped sections distributed along the FIG. 2A shows layout for multi-antenna loops with in-phase state in the electromagnetic-induction system in accordance with one of the preferred embodiment in the present invention.
Figure 2A:
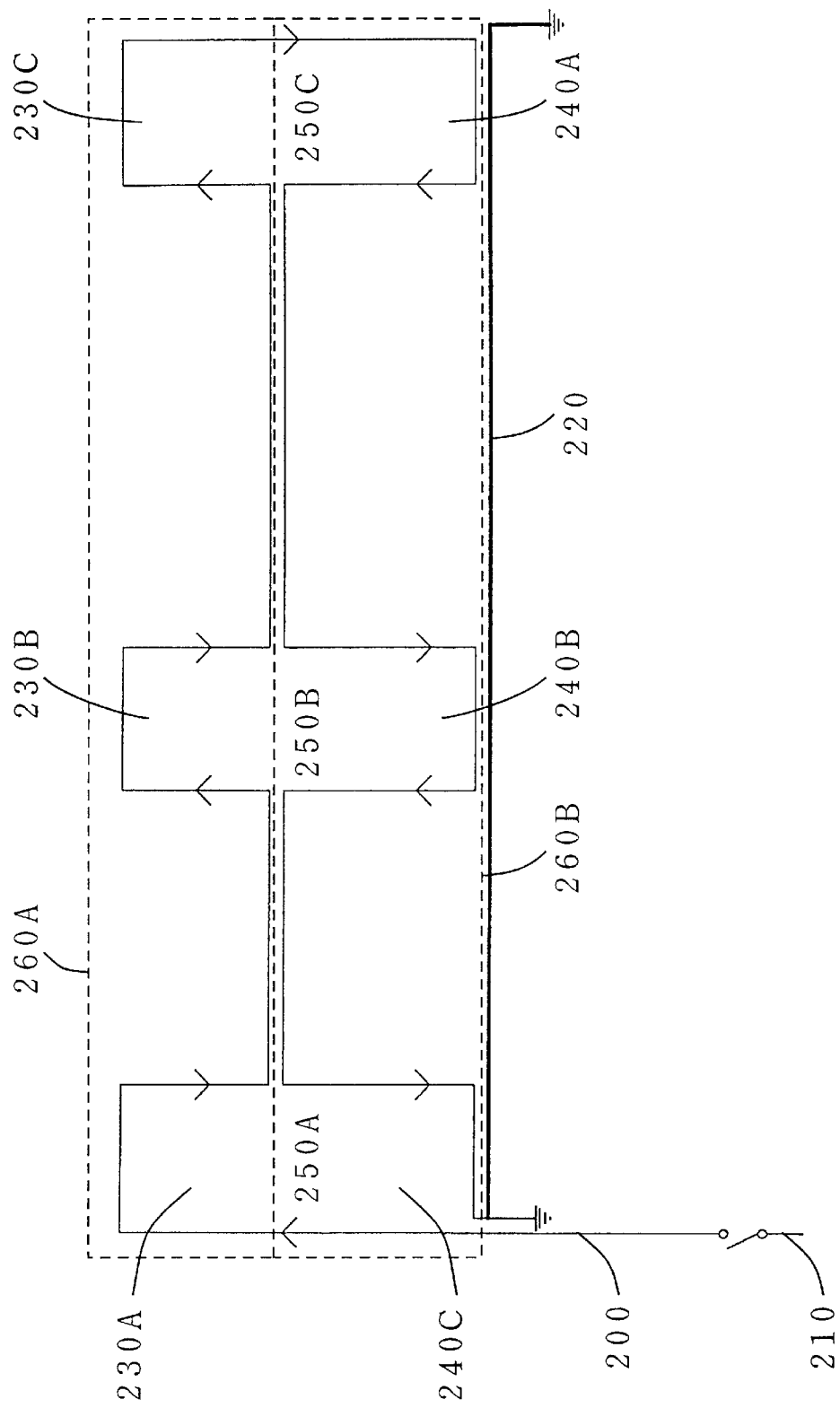
FIG. 2B shows layout for multi-antenna loops with oppositephase state in the electromagnetic-induction system in accordance with one of the preferred embodiment in the present invention.
FIG. 2C shows layout for multi-antenna loops with oppositephase state along the X- and Y-directions in the electromagnetic-induction system in accordance with one of the preferred embodiment in the present invention.
FIG. 2D shows partial layout for multi-antenna loops under the panel of the electromagnetic-induction system in accordance with one of the preferred embodiment in the present invention.

As illustrated in FIG. 2A, in the first embodiment of the present invention, first of all, a multi-antenna loop 200 is provided, wherein the one terminal of multi-antenna loop 200 is electrically coupled with an antenna switch 210 and the other terminal is electrically connected to a ground wire 220. The multi-antenna loop 200 comprises a plurality of n-shaped sections, such as the first n-shaped section 230A, the second n-shaped section 230B, the third n-shaped section 230C and the fourth n-shaped section 240A, the fifth n-shaped section 240B and the sixth n-shaped section 240C, wherein a first sawtooth-shaped region 260A consists of the plurality of n-shaped sections 230A to 230C and a second sawtooth-shaped region 260B consists of the plurality of n-shaped sections 240A to 240C; and further, the first sawtooth-shaped region 260A and the second sawtooth-shaped region 260B are to combine to form a symmetrical antenna loop, wherein each of n-shaped sections 230A to 230C and each of n-shaped sections 240A to 240C are individually in opposition to each other, so as to form a plurality of dummy closed regions 250A to 250C.

Referring to FIG. 2A, in this embodiment of the present invention, if the plurality of dummy closed regions 250A to 250C are in-phase state, the multi-antenna loop 200 is formed by using the non-interlacing method and formation thereof as following: first of all, antenna loop 200 extends upward from the antenna switch 210 to form a first n-shaped section 230A, and then a second n-shaped section 230B and a third n-shaped section 230C are formed in order by extending from the first n-shaped section 230A, wherein the first sawtooth-shaped region 260A are formed by connecting with a sequence of the first n-shaped section 230A, the second n-shaped section 230B and the third n-shaped section 230C from each other; and further, the concaves of the first n-shaped section 230A, the second n-shaped section 230B and the third n-shaped section 230C face the same opening direction. Afterward, the antenna loop 200 extends downward from the third n-shaped section 230C to form a fourth n-shaped section 240A, and then a fifth n-shaped section 240B and a sixth n-shaped section 240C are formed in order by extending from the fourth n-shaped section 240A, wherein the second sawtooth-shaped region 260B are formed by connecting with a sequence of the fourth n-shaped section 240A, the fifth n-shaped section 240B and the sixth n-shaped section 240C from each other; and further, the concaves of the fourth n-shaped section 240A, the fifth n-shaped section 240B and the sixth n-shaped section 240C face the same opening direction; on the other hand, the opening direction of the concaves of the n-shaped sections 240A, 240B and 240C face in opposition to those of the n-shaped sections 230C, 230B and 230A, individually. Finally, the antenna loop 200 extends from the sixth n-shaped section 240C to electrically connected with the ground wire 220, wherein the first dummy closed region 250A consists of the first n-shaped section 230A and the sixth n-shaped section 240C in opposition to each other; similarly, the second dummy closed region 250B consists of the second n-shaped section 230B and the fifth n-shaped section 240B in opposition to each other and the third dummy closed region 250C consists of the third n-shaped section 230C and the fourth n-shaped section 240A in opposition to each other.

Figure 2B:
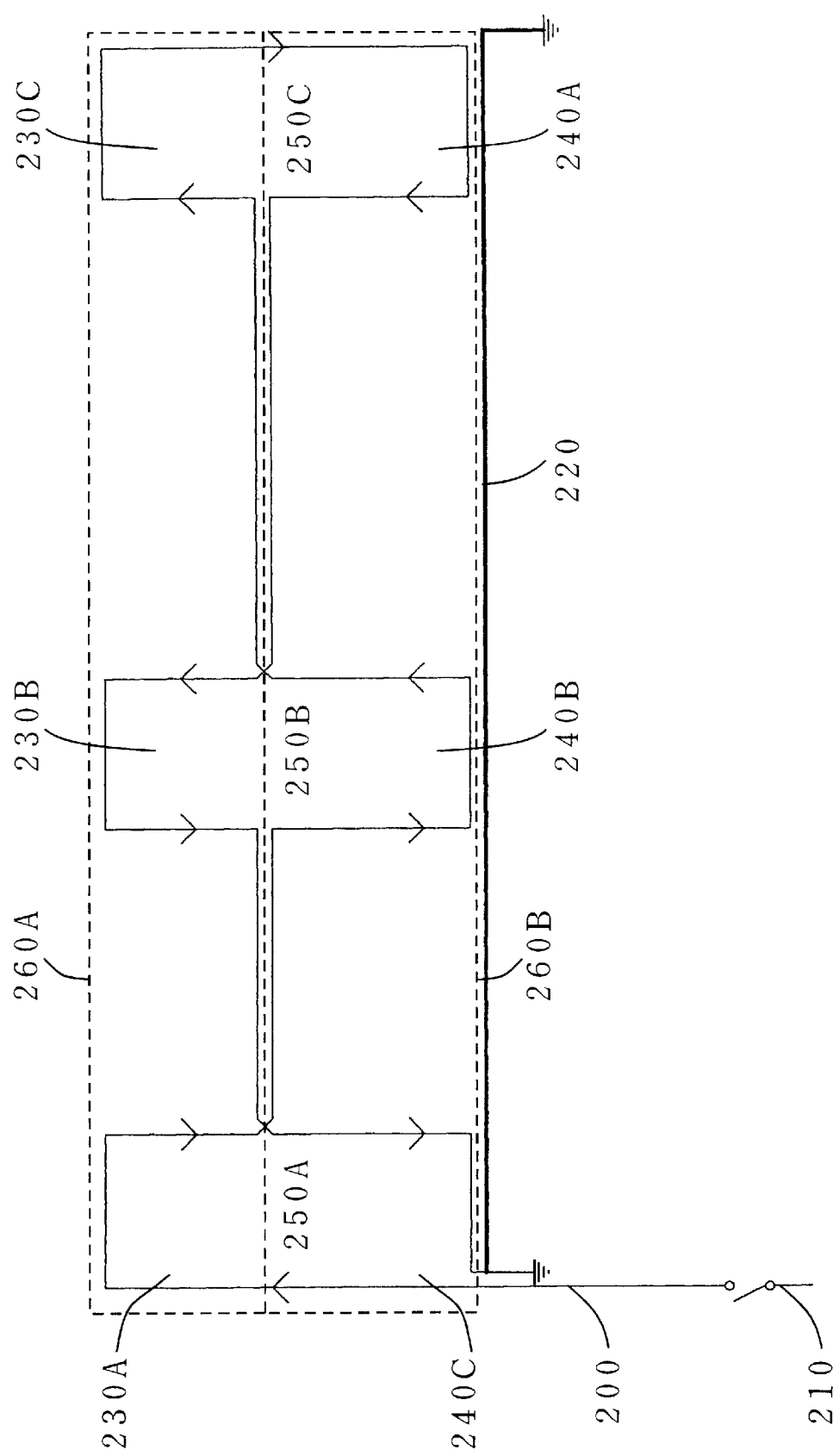

Referring to FIG. 2B, in this embodiment of the present invention, if the plurality of dummy closed regions 250A to 250C are oppositephase state, the multi-antenna loop 200 is formed by using the interlacing method and formation thereof as following: first of all, antenna loop 200 extends upward from the antenna switch 210 to form a first n-shaped section 230A, and then a fifth n-shaped section 240B is formed by extending from the first n-shaped section 230A, wherein the opening direction of the concaves of the first n-shaped section 230A and the fifth n-shaped section 240B face in opposition to each other. Afterward, a third n-shaped section 230C is formed by extending from the fifth n-shaped section 240B, wherein the opening direction of the concaves of the third n-shaped section 230C and the fifth n-shaped section 240B face in opposition to each other; and further, the concaves of the third n-shaped section 230C and the first n-shaped section 230A face the same opening direction. Subsequently, the antenna loop 200 extends downward from the third n-shaped section 230C to form a fourth n-shaped section 240A, and then a second n-shaped section 230B is formed by extending from the fourth n-shaped section 240A, wherein the opening directions of the concaves of the third n-shaped section 230C and the fourth n-shaped section 240A face in opposition to each other, and the opening directions of the concaves of the fourth n-shaped section 240A and the second n-shaped section 230B face similarly in opposition to each other; and further, the concaves of the second n-shaped section 230B and the third n-shaped section 230C face the same opening direction. Then a sixth n-shaped section 240C is formed by extending from the second n-shaped section 240B, wherein the opening directions of the concaves of the sixth n-shaped section 240C and the first n-shaped section 230A face in opposition to each other, and the concaves of the sixth n-shaped section 240C and the second n-shaped section 240B face the same opening direction. Finally, the antenna loop 200 extends from the sixth n-shaped section 240C to electrically connected with the ground wire 220.

Furthermore, the first n-shaped section 230A, the second n-shaped section 230B and the third n-shaped section 230C whose the phase states are in opposition to each other are compounded into the first sawtooth-shaped region 260A, and then the forth n-shaped section 240A, the fifth n-shaped section 240B and the sixth n-shaped section 240C whose the phase states are in opposition to each other are compounded into the second sawtooth-shaped region 260B. Moreover, the first dummy closed region 250A consists of the first n-shaped section 230A and the sixth n-shaped section 240C whose concaves are in opposition to each other and phase states are in-phase; similarly, the second dummy closed region 250B consists of the second n-shaped section 230B and the fifth n-shaped section 240B whose concaves are in opposition to each other and phase states are in-phase and the third dummy closed region 250C consists of the third n-shaped section 230C and the fourth n-shaped section 240A whose concaves are in opposition to each other and phase states are in-phase. Because the adjacent dummy closed regions 250A, 250B and 250C present the oppositephase state from each other, the noise generated by interfering with the antenna loop 200 during interference from the magnetic field of surrounding can be weakened by generating voltage with the opposite polar state via the adjacent dummy closed regions 250A, 250B and 250C with the oppositephase state from each other.

Figure 2D:
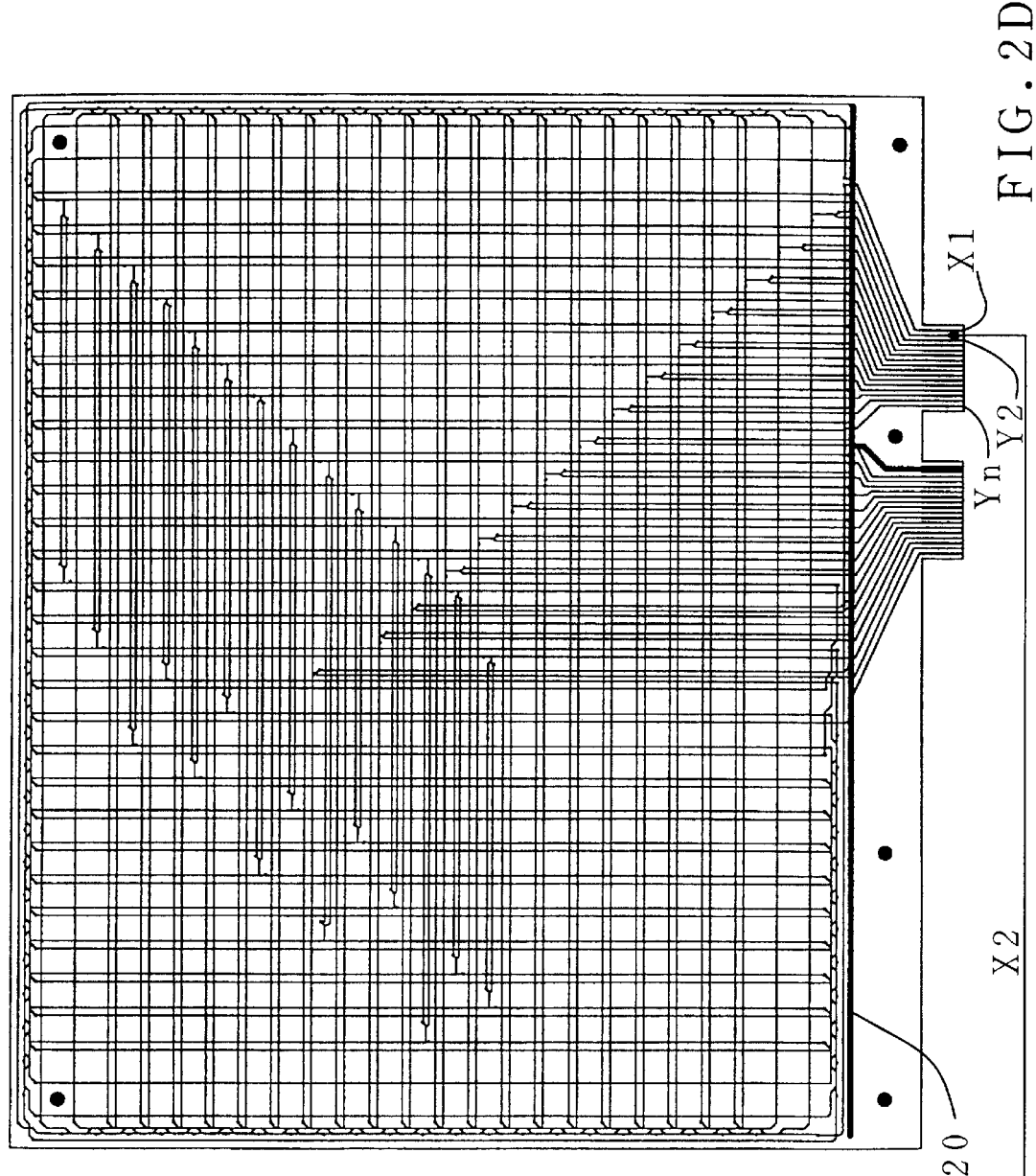
Figure 2D:
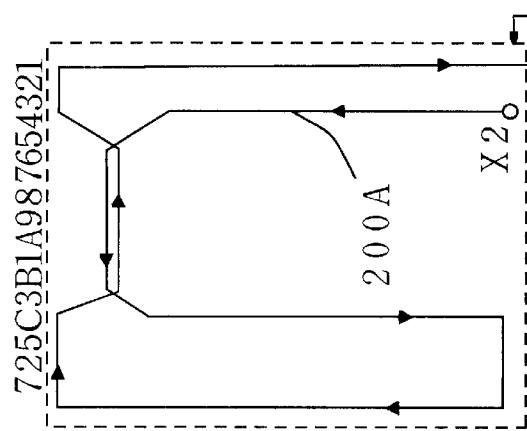

Referring to FIG. 2C, in this embodiment of the present invention, the antenna loops 200A and 200B are distributed along the X- and the Y-directions of two-dimensional Cartesian coordinates, individually; and further, the layout of antenna loop along the X-direction is formed by crossing the plurality of dummy closed regions 250A, 250B and 250C from each other with the interlacing method; besides, that along the Y-direction is formed by crossing the plurality of dummy closed regions 270A, 270B and 270C from each other with the same method. On the other hand, one terminals of the antenna loops 200A and 200B are electrically coupled with the same ground wire 220, and the other terminals of those are individually electrically coupled with the plurality of antenna switches 210A and 210B. Furthermore, referring to FIG. 2D, that shows the partial layout for the multi-antenna loops under the panel of the electromagnetic-induction system, wherein the distribution of the antenna loop 200A along X-direction that is connected with the antenna switch X2 is shown in FIG. 2D, and the dummy closed regions of the antenna loop 200A are located on the logic address 2 as shown in FIG. 2D. Moreover, the antenna loops are arranged with alternate the X- and Y-directions, such as the antenna switches X2 and Y2.

In this embodiment of the present invention, the present invention can form antenna loop with sawtooth-shaped section and dummy closed section by n-shaped section with in-phase state to perform the layout of multi-antenna loops, so as to reduce amount of antenna switches and to distribute entire antenna loops along X-direction and Y-direction within the same ground wire. Accordingly, this invention can so reduce the space requirement and the panel area thereof that it scales product's size down and makes productive cost down. Therefore, this invention corresponds to economic effect and utilization in industry. On the other hand, the present invention can form an antenna loop with sawtooth-shaped sections and dummy closed sections by n-shaped sections with oppositephase state to perform a layout of multi-antenna loops so as to reduce amount of antenna switches, and in order that the entire antenna loops along X- and Y-directions can be distributed within the same ground wire. Accordingly, this invention can avoid jamming antenna loops with electromagnetic noise around the tablet, so that the efficiency of electromagnetic-induction system can be strengthened.

Of course, it is possible to apply the present invention for the antenna loops of the electromagnetic-induction system, and to any apparatus with layout of antenna loops. Also, the present invention can apply the sawtooth-shaped regions in opposition of each other to form dummy closed region, so as to reduce amount of devices and requirement for designing space; on the other wards, this invention has not been developed in concerning the electromagnetic-induction system at present.

Obviously, many modifications and variations of the present invention are possible in light of the above teachings. It is therefore to be understood that within the scope of the appended claims, the present invention may be practiced otherwise than as specifically described herein.

Although specific embodiments have been illustrated and described, it will be obvious to those skilled in the art that various modifications may be made without departing from what is intended to be limited solely by the appended claims.

What is claimed is:

1. An antenna loop structure, said structure comprising:
    a plurality of first n-shaped sections, the concaves of said plurality of first n-shaped sections face the same opening direction, wherein one of said plurality of first n-shaped sections is electrically coupled with an antenna switch;
    a plurality of second n-shaped sections, the concaves of said plurality of second n-shaped sections face the same opening direction, the opening direction of the concaves of said plurality of second n-shaped sections and first n-shaped sections are in opposition to each other, wherein one of said plurality of second n-shaped sections is electrically coupled with a ground wire; and
    a plurality of dummy closed regions, each dummy closed region consists of said each first n-shaped section and said each second n-shaped section in opposition to each other.

2. The structure according to claim 1, wherein said plurality of first n-shaped sections are to combine to form a first sawtooth-shaped region.

3. The structure according to claim 2, wherein said plurality of second n-shaped sections are to combine to form a second sawtooth-shaped region.

4. The structure according to claim 3, wherein one terminal of said second sawtooth-shaped region is connected with that of said first sawtooth-shaped region.

5. The structure according to claim 1, wherein said plurality of dummy closed regions are in-phase state from each other.

6. The structure according to claim 5, wherein the method for forming the in-phase state between said plurality of dummy closed regions is the non-interlacing method.

7. The structure according to claim 1, wherein said plurality of dummy closed regions are oppositephase state from each other.

8. The structure according to claim 7, wherein the method for forming the oppositephase state between said plurality of dummy closed regions is the interlacing method.

9. An antenna loop structure with in-phase state, said structure comprising:
    a first sawtooth-shaped region, said first sawtooth-shaped region has a plurality of first n-shaped sections whose the concaves face the same opening direction, and said plurality of first n-shaped sections are connected with each other;
    a second sawtooth-shaped region, said second sawtooth-shaped region has a plurality of second n-shaped sections whose the concaves face the same opening direction, and said plurality of second n-shaped sections are connected with each other, wherein the opening direction of the concaves of said plurality of second n-shaped sections and first n-shaped sections are in opposition to each other, and one terminal of said second sawtooth-shaped region is connected with that of said first sawtooth-shaped region; and
    a plurality of dummy closed regions, said each dummy closed region consists of said each first n-shaped section and said each second n-shaped section from each other, wherein said plurality of dummy closed regions are in-phase state from each other.

10. The structure according to claim 9, wherein said first sawtooth-shaped region is electrically connected with an antenna switch by using one of said plurality of first n-shaped sections.

11. The structure according to claim 9, wherein said second sawtooth-shaped region is electrically connected with a ground wire by using one of said plurality of second n-shaped sections.

12. The structure according to claim 9, wherein the method for forming the in-phase state between said plurality of dummy closed regions is the non-interlacing method.

13. An antenna loop structure with oppositephase state, said structure comprising:
   a first sawtooth-shaped region, said first sawtooth-shaped region has a plurality of first n-shaped sections whose the concaves face the same opening direction with oppositephase state from each other;
   a second sawtooth-shaped region, said second sawtooth-shaped region has a plurality of second n-shaped sections whose the concaves face the same opening direction with oppositephase state from each other, wherein the opening direction of the concaves of said plurality of second n-shaped sections and first n-shaped sections are in opposition to each other, and one terminal of said second sawtooth-shaped region is connected with that of said first sawtooth-shaped region; and
   a plurality of dummy closed regions, said each dummy closed region consists of said each first n-shaped section and said each second n-shaped section with the same phase state from each other, wherein said plurality of dummy closed regions are oppositephase from each other.

14. The structure according to claim 13, wherein said first sawtooth-shaped region is electrically connected with an antenna switch by using one of said plurality of first n-shaped sections.

15. The structure according to claim 13, wherein said second sawtooth-shaped region is electrically connected with a ground wire by using one of said plurality of second n-shaped sections.

16. The structure according to claim 13, wherein the method for forming the oppositephase state between said plurality of dummy closed regions is the interlacing method.

17. A layout of multi-antenna loop with in-phase state, said layout comprising:
   providing an antenna loop;
   extending said antenna loop to form a first n-shaped section;
   extending said first n-shaped section to form a second n-shaped section and a third n-shaped section in order, wherein the concaves of said first n-shaped section, said second n-shaped section and said third n-shaped section face the same opening direction;
   extending said third n-shaped section to form a fourth n-shaped section, wherein the opening direction of the concave of the fourth n-shaped section faces in opposition to those of the third n-shaped section, and said third n-shaped section and said fourth n-shaped section are to combine to form a first dummy closed region; and
   extending said fourth n-shaped section to form a fifth n-shaped section and a sixth n-shaped section in order, wherein the concaves of said fourth n-shaped section, said fifth n-shaped section and said sixth n-shaped section face the same opening direction, said fifth n-shaped section and said second n-shaped section in opposition to each other are to combine to form a second dummy closed region, said sixth n-shaped section and said first n-shaped section in opposition to each other are to combine to form a third dummy closed region, and further, said first dummy closed region, said second dummy closed region and said third dummy closed region are in-phase state from each other.

18. The layout according to claim 17, wherein said first n-shaped section, said second n-shaped section and said third n-shaped section are to combine to form a first sawtooth-shaped region.

19. The layout according to claim 18, wherein said first sawtooth-shaped region is electrically coupled with an antenna switch by using said first n-shaped section.

20. The layout according to claim 17, wherein said fourth n-shaped section, said fifth n-shaped section and said sixth n-shaped section are to combine to form a second sawtooth-shaped region.

21. The layout according to claim 20, wherein said second sawtooth-shaped region is electrically coupled with a ground wire by using said sixth n-shaped section.

22. The layout according to claim 17, wherein the method for forming in-phase state among said first dummy closed region, said second dummy closed region and said third dummy closed region is the non-interlacing method.

23. A layout of multi-antenna loop with oppositephase state, said layout comprising:
   providing an antenna loop;
   extending said antenna loop to form a first n-shaped section;
   extending said first n-shaped section to form a second n-shaped section, wherein the opening direction of the concaves of said first n-shaped section and said second n-shaped section face in opposition to each other;
   extending said second n-shaped section to form a third n-shaped section, wherein the opening direction of the concaves of said third n-shaped section and said second n-shaped section face in opposition to each other, and the concaves of said third n-shaped section and said first n-shaped section face the same opening direction;
   extending said third n-shaped section to form a fourth n-shaped section, wherein the opening direction of the concaves of said third n-shaped section and said fourth n-shaped section face in opposition to each other, and the concaves of said fourth n-shaped section and said second n-shaped section face the same opening direction, said third n-shaped section and said fourth n-shaped section are to combine to form a first dummy closed region;
   extending said fourth n-shaped section to form a fifth n-shaped section, wherein the opening direction of the concaves of said fifth n-shaped section and said second n-shaped section face in opposition to each other, and the concaves of said fifth n-shaped section and said third n-shaped section face the same opening direction, said fifth n-shaped section and said second n-shaped section are to combine to form a second dummy closed region, said second dummy closed region and said first dummy closed region are oppositephase state; and
   extending said fifth n-shaped section to form a sixth n-shaped section, wherein the opening direction of the concaves of said sixth n-shaped section and said first n-shaped section face in opposition to each other, and the concaves of said sixth n-shaped section and said second n-shaped section face the same opening direction, said sixth n-shaped section and said first n-shaped section are to combine to form a third dummy closed region, said third dummy closed region and said second dummy closed region are oppositephase state, said third dummy closed region and said first dummy closed region are in-phase state.

24. The layout according to claim 23, wherein said first n-shaped section, said third n-shaped section and said fifth n-shaped section are to combine to form a first sawtooth-shaped region.

25. The layout according to claim 24, wherein said first sawtooth-shaped region is electrically coupled with an antenna switch by using said first n-shaped section.

26. The layout according to claim 23, wherein said second n-shaped section, said fourth n-shaped section and said sixth n-shaped section are to combine to form a second sawtooth-shaped region.

27. The layout according to claim 26, wherein said second sawtooth-shaped region is electrically coupled with a ground wire by using said sixth n-shaped section.

28. The layout according to claim 23, wherein the method for forming oppositephase state among said first dummy closed region, said second dummy closed region and said third dummy closed region is the interlacing method.

29. A layout for multi-antenna loops of the electromagnetic-induction system, said layout comprising:

a plurality of first antenna loops with a plurality of dummy closed regions, wherein said plurality of first antenna loops are distributed along the X-direction of two-dimensional Cartesian coordinates under the panel of the electromagnetic-induction system;

a plurality of second antenna loops with said plurality of dummy closed regions, wherein said plurality of second antenna loops are distributed along the Y-direction of two-dimensional Cartesian coordinates under the panel of the electromagnetic-induction system;

a ground wire, wherein said plurality of first antenna loops and said plurality of second antenna loops are electrically connected with said ground wire; and a plurality of antenna switches, wherein every one of said plurality of first antenna loops and said plurality of second antenna loops is electrically connected with every one of said plurality of antenna switches.

30. The layout according to claim 29, each said dummy closed region comprises two n-shaped sections with the concaves in opposition to each other.

31. The layout according to claim 29, wherein said plurality of dummy closed regions are in-phase state from each other.

32. The layout according to claim 31, wherein the method for forming in-phase state among said plurality of dummy closed regions is non-interlacing method.

33. The layout according to claim 29, wherein said plurality of dummy closed regions are oppositephase state from each other.

34. The layout according to claim 33, wherein the method for forming oppositephase state among said plurality of dummy closed regions is interlacing method.

35. The layout according to claim 29, wherein said plurality of first antenna loops and said plurality of second antenna loops are alternately distributed along the X-direction and the Y-direction.

* * * * *